United States Patent [19]

Ochoizki

[11] Patent Number: 5,551,234
[45] Date of Patent: Sep. 3, 1996

[54] PROCESS FOR RUNNING A MARINE DIESEL ENGINE

[76] Inventor: Horst Ochoizki, Röthgener Str. 53, 52249 Eschweiler, Germany

[21] Appl. No.: 256,615

[22] PCT Filed: Dec. 8, 1992

[86] PCT No.: PCT/DE92/01019

§ 371 Date: Nov. 21, 1994

§ 102(e) Date: Nov. 21, 1994

[87] PCT Pub. No.: WO93/14306

PCT Pub. Date: Jul. 22, 1993

[30] Foreign Application Priority Data

Jan. 14, 1992 [DE] Germany .......................... 42 00 661.9

[51] Int. Cl.[6] ........................................... F02B 29/04
[52] U.S. Cl. .................................................. 60/599
[58] Field of Search ............................ 60/599; 123/563

[56] References Cited

U.S. PATENT DOCUMENTS 4,562,697  1/1986  Lawson ..................... 123/563

FOREIGN PATENT DOCUMENTS

| | | |
|---|---|---|
| 3226883 | 8/1983 | Germany . |
| 3617350C1 | 5/1986 | Germany . |
| 3929124A1 | 9/1989 | Germany . |
| 2929123 | 3/1990 | Germany . |
| 59-141718 | 8/1984 | Japan . |
| 1255956 | 12/1971 | United Kingdom ............. 123/563 |
| 2223272 | 4/1989 | United Kingdom . |

OTHER PUBLICATIONS

MTZ Motortechnische Zeitschrift 49 (1988) 7/8, pp. 294/295.

*Primary Examiner*—Michael Koczo
*Attorney, Agent, or Firm*—David C. Purdue; John C. Purdue

[57] ABSTRACT

In a process for running an internal combustion engine, especially a marine diesel engine, compressed air is taken to the cylinders by an exhaust gas turbocharger (1). The air is cooled before its introduction into the cylinders. Part of the charge air, however, by-passes the cooler (5). Its quantity is determined so that the charge air temperature behind the cooler (5) for all the charge air is above the dew point and does not exceed the maximum permissible temperature for the engine. It is thus possible to increase the charge air pressure. By-pass line (9) is fitted with a control valve. The charge air cooler is water-cooled. A cooling jacket (12) may be fitted around by-pass line (9).

4 Claims, 1 Drawing Sheet

PROCESS FOR RUNNING A MARINE DIESEL ENGINE

FIELD OF THE INVENTION

This invention relates to the field of internal combustion engines, particularly those for marine use. More specifically, the invention is concerned with a method for cooling charge air so as to maximize performance of the engine.

DESCRIPTION OF PRIOR ART AND SUMMARY OF THE INVENTION

The invention relates to a procedure for running an internal combustion engine, especially a marine diesel engine, where charging air is supplied to the cylinders by means of an exhaust gas turbo charger. Said air is conducted through a charge air cooler, but can also partially bypass the cooler. The invention also describes an internal combustion engine suited to the practice of such a procedure, especially a marine diesel engine provided with an exhaust gas turbo charger and a charge air cooler, which is connected by a charge air line to the exhaust air turbo charger on one side and to the cylinders of the combustion engine on the other side, and where a by-pass line with a control valve is provided which bypasses the charge air cooler.

It is a well known fact that charge air coolers, e.g. those for marine diesel engines, in time become clogged at the charge air intake side, resulting in correspondingly higher throughput resistance. This in turn leads to a reduction of charge air pressure and, consequently, to a decrease in engine power, which has to be compensated for by increased fuel consumption. Simultaneously, the exhaust gas turbo charger experiences increased loading.

An internal combustion engine with an exhaust gas turbo charger is already a state of the art item (DE 36 27 686 A1), it features a charge air line in which a charge air cooler is installed. In order to provide for relatively high charge air temperatures during the warm-up phase of this internal combustion engine across the complete load-and r.p.m.-range, but nevertheless prevent problems during the operating temperature phase of the engine, a by-pass line branches off and bypasses the charge air cooler. This by-pass line carries the total charge air stream until a predetermined engine temperature has been reached. Once the operating temperature of the engine has been reached, the by-pass line is blocked by means of a suitable valve-device, and all the charge air is conducted through the charge air cooler.

It is the objective of this invention to describe a procedure, and a suitable internal combustion engine for the procedure, with which the resistance which has to be overcome by the charge air is lowered overall, while the charge air pressure, and resulting therefrom the engine power, is increased; or, as resistance across the charge air cooler increases, the charge air pressure can be maintained. Simultaneously, the fuel consumption of the engine shall be reduced, and the load on the exhaust gas turbo charger shall be lowered.

This task is achieved by the above mentioned procedure, and according to this invention, by feeding water as coolant to the charge air cooler, by by-passing part of the charge air around the cooler even during normal operation of the engine, and by controlling the amount of by-passed air, so that, downstream of the charge air cooler, the total charge air will have a charge air temperature which is above the dew-point and does not exceed the maximum permissible charge air temperature for the engine. In all situations, where the total available cooling capacity of the charge air cooler, e.g. because of low cooling water temperature, would result in charge air temperatures which are too low, part of the charge air will be by-passed around the charge air cooler. This partial amount of charge air is controlled in such a manner that the resulting total charge air mixture, downstream of the charge air cooler, does not exceed the permissible temperature values. The charge air which has by-passed the charge air cooler meets with a clearly reduced resistance to passage, compared with the charge air conducted through the charge air cooler. This results in a desired increase of charge air pressure downstream of the charge air cooler. This, on the one hand, has the consequence of reduced loading of the exhaust gas turbo charger, and, on the other hand results in an increase of engine power, or, respectively maintains engine power, even in the event of increasing throughput resistance, caused by clogging, of the charge air cooler.

The procedure according to this invention is preferably practiced in such a manner that charge air temperature is held to a range between 40°–45 ° C.

The procedure according to this invention can furthermore be practiced by using sea-water as coolant for the charge air cooler. Since the design of the charge air cooler for marine diesel engines in principle has to take into account that the prescribed charge air temperature will be guaranteed, even in case of the highest plausible sea-water temperatures, it results that for higher temperatures, especially for those under 25° C., part of the charge air will always be by-passed around the charge air cooler and can thus be used for the described increase of the charge air pressure.

The procedure according to this invention can furthermore be practiced in such a manner that the charge air cooler is supplied with a constant throughput of coolant. Control of the charge air temperature can then be achieved simply by determining the amount of charge air which bypasses around the charge air cooler.

The procedure according to this invention can furthermore be practiced by cooling the by-passed charge air without increasing its throughput resistance. The internal combustion engine suitable for practicing the procedure of this invention is characterized by the fact that the charge air cooler is of the water-cooled type.

The combustion engine suitable to this invention can furthermore be of such design that the by-pass line is provided with a water-cooling jacket. While such a cooling device is of relatively low efficiency, it does not result in increased throughput resistance for the amount of bypassed charge air.

Finally, the combustion engine suitable to this invention can be of such design that the charge air line passing through the charge air cooler, and the downstream by-pass line, connect to a mixing chamber which provides access to the individual cylinders of the engine. Introduction of the two separate charge air streams may be optimized by suitable directional arrangements. This provides assurance that all cylinders are provided with charge air of uniform temperature. In the following, the procedure according to this invention and one version of a suitable design of the internal combustion engine, will be described in the form of a schematic equipment drawing.

DETAILED DESCRIPTION OF THE INVENTION

Figure 1:
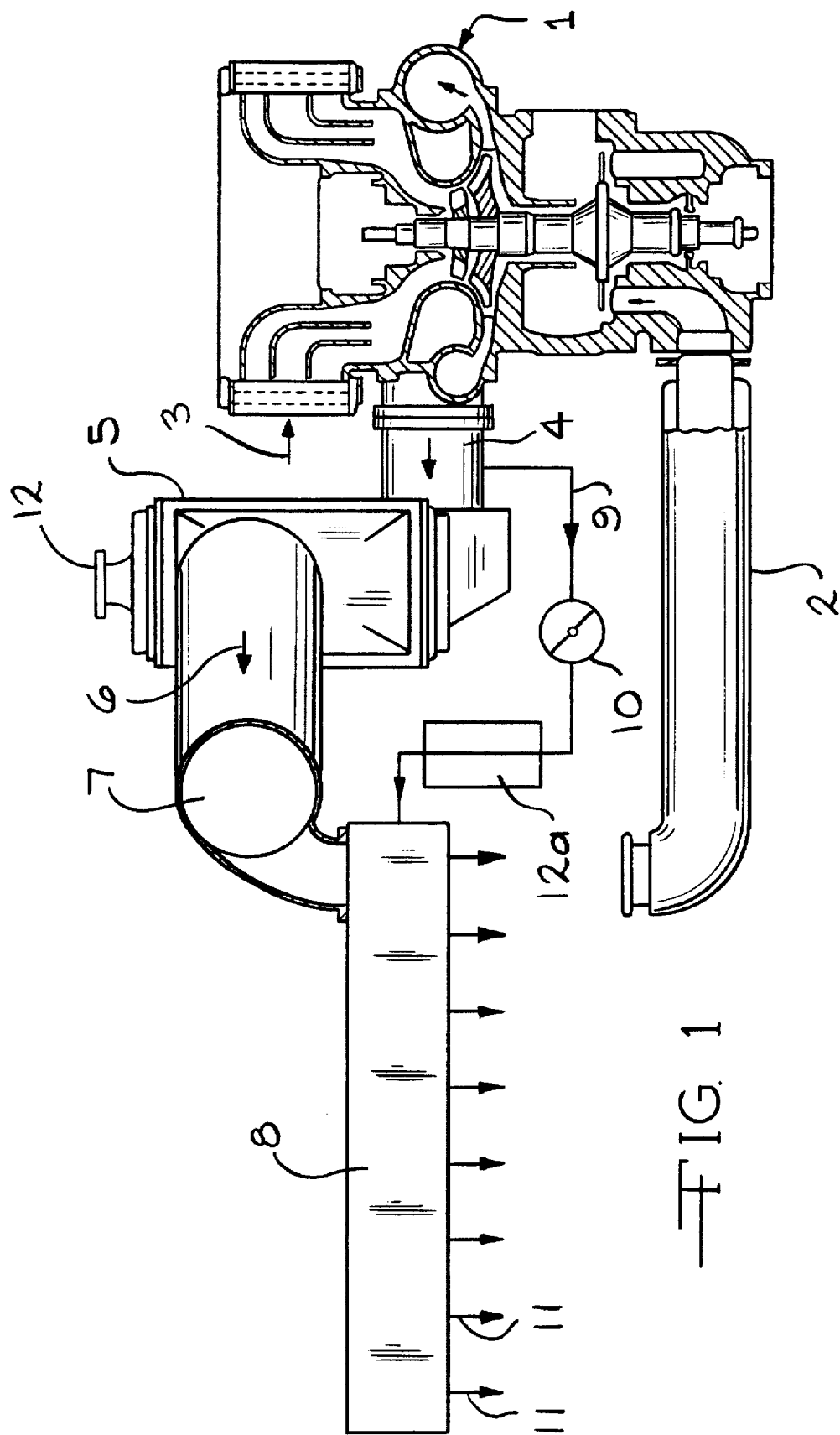
FIG. 1 is a schematic view of an engine equipped to be operated according to the method of the instant invention.

The drawing shows an exhaust gas turbo charger (1) of conventional design; it is powered by the exhaust gases of an internal combustion engine which is not detailed in specifics. These exhaust gases are conducted to the exhaust gas turbo charger (1) via an exhaust gas line (2).

Exhaust gas turbo charger (1) takes in ambient air in the direction of arrow (3) and conveys it into the first segment (4) of a charge air line which opens into a sea-water cooled charge air cooler (5). The cooled air exits from charge air cooler (5) in the direction of arrow (6) through a second segment (7) of the charge air line and enters mixing chamber (8). In addition, a by-pass line (9) is provided which bypasses charge air cooler (5) and is connected to the first segment (4) of the charge air line, and also connects to mixing chamber (8). By-pass line (9) is fitted with a control valve (10).

Mixing chamber (8) is individually connected via connection lines (11) to the cylinders of the engine, which are not further detailed. Charge air cooler (5) features a connection (12) for in-flowing and exiting sea-water as coolant.

If all the charge air coming from exhaust gas turbo charger (1) is conveyed through the charge air line (4,7) to charge air cooler (5), and if cooler (5) is being run with the maximum possible coolant throughput, the charge air in general will be excessively cooled. In order to prevent this, it would be necessary to run the cooler with a reduced amount of coolant. According to the procedure of this invention, one proceeds instead in the following manner, namely by passing a certain amount of the charge air through by-pass line (9) and control valve (10), i.e. without cooling, directly to mixing chamber (8). Thus, in mixing chamber (8) two charge air streams are mixed together, one air stream has passed through cooler (5) and was cooled down, while the other air stream has been conducted through by-pass line (9). The amount of charge air which is conducted through by-pass line (9) is determined by control valve (10) in such a manner, that the total charge air temperature in mixing chamber (8) does not exceed the highest permissible charge air temperature for the engine. In general, the charge air temperature is to be kept in the range of 40°–45° C. By this measure the charge air pressure in mixing chamber (8) is increased due to the fact that the charge air component which is conducted through by-pass line (9) is at a higher pressure than the charge air component which has passed through cooler (5); the throughput resistance of cooler (5) is much higher than that of by-pass line (9), a fact that is self-evident. An increase in charge air pressure in mixing chamber (8) results in increased power for the internal combustion engine, or, respectively, for the same power output of the engine, a reduced loading of exhaust gas turbo charger (1) results. The cylinders of the internal combustion engine are more effectively flushed and charged.

Controlled opening of by-pass line (9) can also be used to counteract a drop-off in charge air pressure, which, for instance, might result from partial clogging of cooler (5) on the intake side. Thus, according to this invention, charge air in cooler (5) is cooled down as far as possible, as a function of the sea-water temperature used as coolant. This temperature is then increased to the permissible range for the engine by conducting part of the charge air around cooler (5), with the uncooled air entering mixing chamber (8).

By-pass line (9) can be provided with a cooling jacket (12), which is also sea-water supplied. Such a cooling jacket (12) does not increase throughput resistance through line (9), but does cause a minimal amount of cooling of the charge air passed through by-pass line (9). This results in the consequence that a larger proportion of charge air can be conducted through by-pass line (9) while maintaining the temperature in mixing chamber (8), again increasing the charge air pressure, or, respectively, lowering the load on exhaust gas turbo charger (1) even further.

I claim:

1. A method for running a marine diesel engine comprising at least one cylinder, a sea-water-cooled charge air cooler, an exhaust gas turbocharger, means for delivering air from the turbocharger, through said charge air cooler to the at least one cylinder and means for delivering air from the turbocharger directly to the at least one cylinder while bypassing the charge air cooler, said method comprising the steps of supplying the at least one cylinder of the engine with charge air from the exhaust gas turbocharger, conducting, when charge air cooling is required to maintain the charge air temperature within a suitable temperature range for the marine diesel engine, some charge air from the exhaust gas turbocharger through the sea-water-cooled charge air cooler before it is delivered to the at least one cylinder, conducting, when charge air cooling is required to maintain the charge air temperature within a suitable temperature range for the marine diesel engine, a constant throughput of sea-water through the charge air cooler, bypassing some or all of the charge air from the exhaust gas turbocharger around the charge air cooler for mixture with the charge air, if any, which has been conducted through the charge air cooler, cooling the charge air which charge air cooler by jacket cooling before it is delivered to the at least one cylinder, delivering bypassed air or a mixture of bypassed air and charge air that has been conducted through the charge air cooler to the at least one cylinder and controlling the amount of charge air which bypasses the charge air cooler so that the temperature of the charge air which is delivered to the at least one cylinder is above the dew point of that air and does not exceed the maximum permissible temperature for the marine diesel engine, wherein, during normal operation of the diesel engine, a portion or the charge air which is delivered to the at least one cylinder is air that has bypassed the charge air cooler.

2. The method according to claim 1 wherein, after engine warm-up, the temperature of the charge air that is delivered to the at least one cylinder is between 40°–45 ° C.

3. The method according to claim 1 wherein the constant throughput of sea-water which is conducted through the charge air cooler is the maximum sea water throughput of the charge air cooler.

4. The method according to claim 2 wherein the constant throughput of sea-water which is conducted through the charge air cooler is the maximum sea water throughput of the charge air cooler.

* * * * *

UNITED STATES PATENT AND TRADEMARK OFFICE
CERTIFICATE OF CORRECTION

PATENT NO. : 5,551,234
DATED : September 3, 1996
INVENTOR(S) : Horst Ochotzki

It is certified that error appears in the above-indentified patent and that said Letters Patent is hereby corrected as shown below:

On the title page, item [76],
The inventor's last name should be spelled Ochotzki Column 4, line 38 should read:
    cooling the charge air which bypasses the charge air cooler
        by jacket Signed and Sealed this Tenth Day of December, 1996

Attest:

BRUCE LEHMAN

Attesting Officer

Commissioner of Patents and Trademarks